April 8, 1969     S. G. DOMEN, SR     3,436,963
APPARATUS FOR MAKING STANDARDIZED TAPE SPECIMENS
Filed Jan. 31, 1967     Sheet 1 of 3
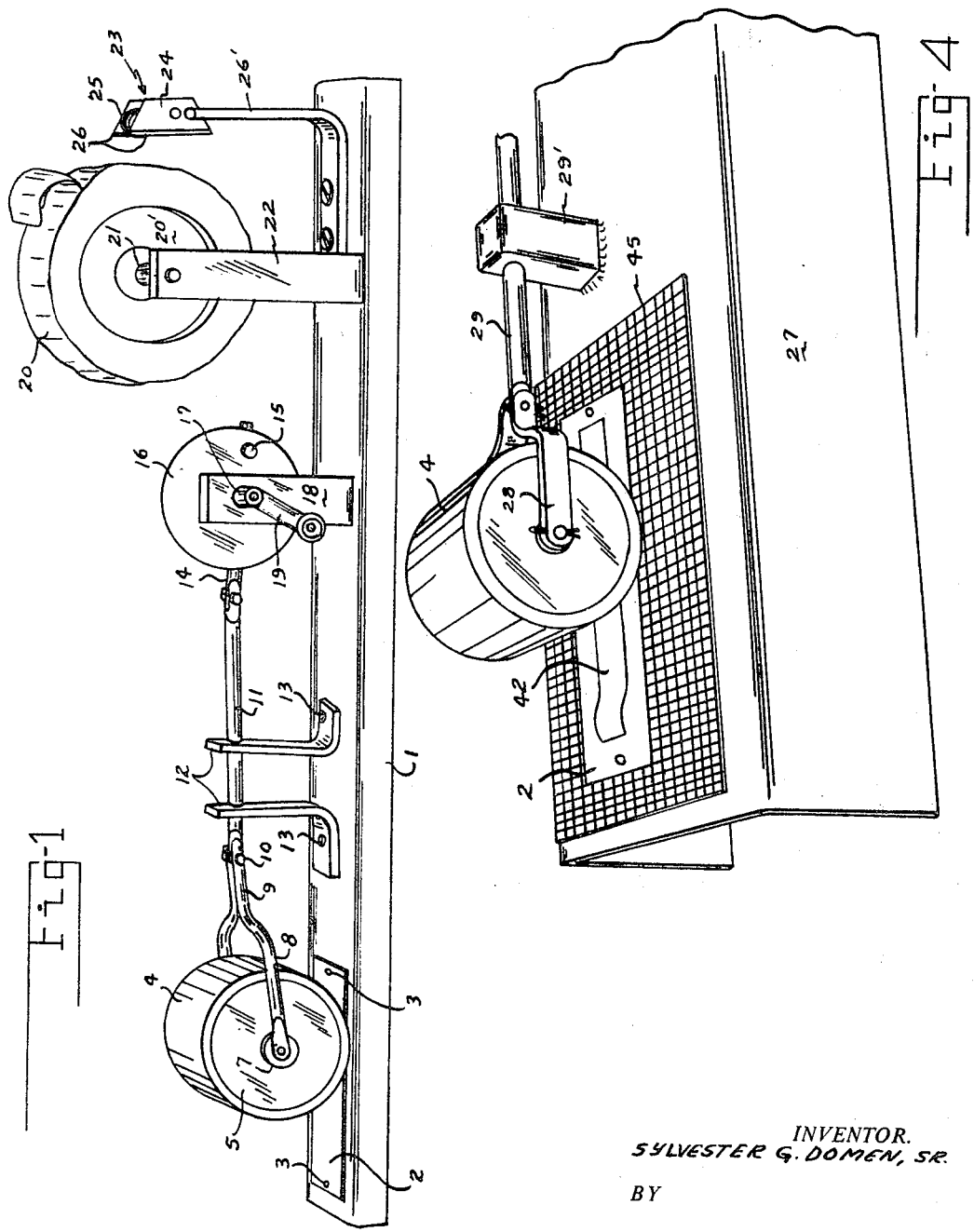
INVENTOR.
SYLVESTER G. DOMEN, SR.
BY
Herbert H. Brown
ATTORNEYS

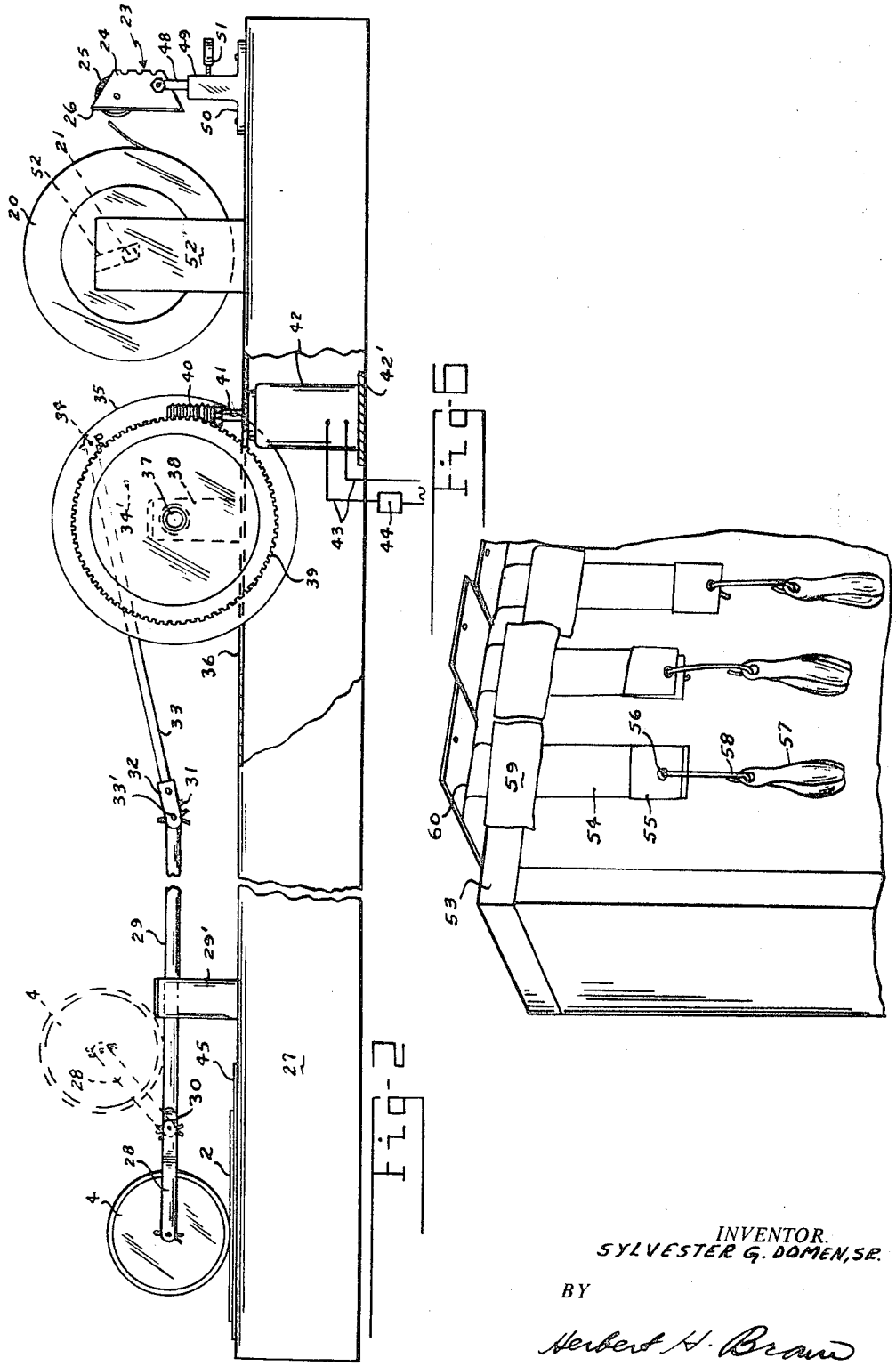

April 8, 1969     S. G. DOMEN, SR     3,436,963
APPARATUS FOR MAKING STANDARDIZED TAPE SPECIMENS
Filed Jan. 31, 1967
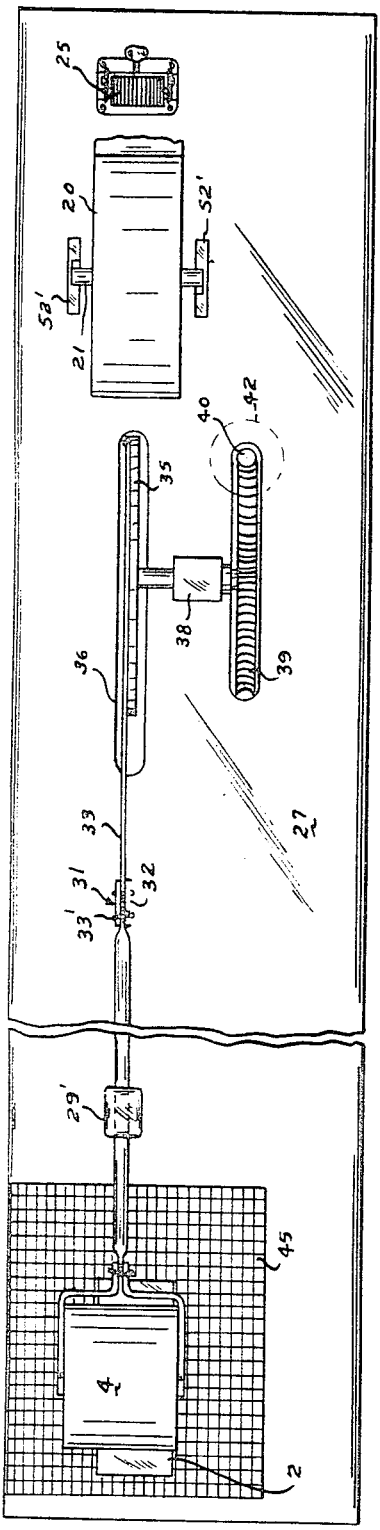
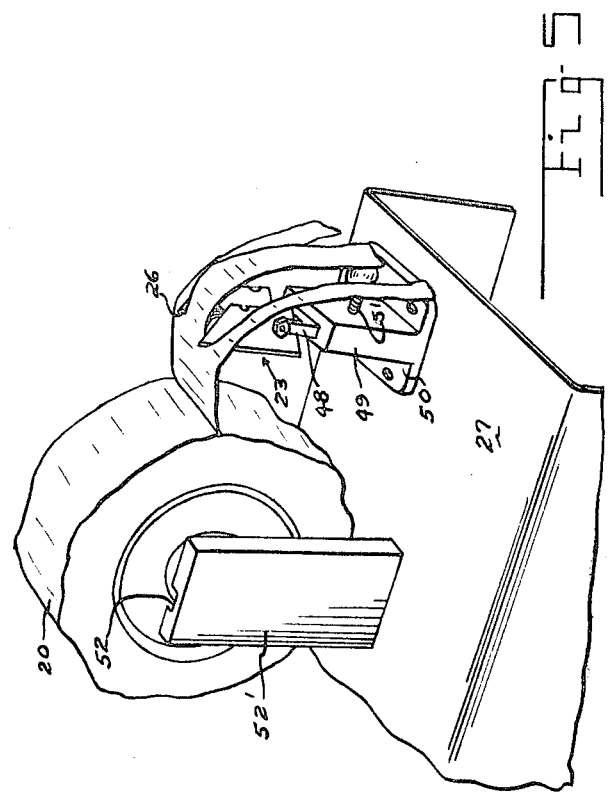
INVENTOR.
SYLVESTER G. DOMEN, SR.
BY
Herbert H. Brown
ATTORNEYS

United States Patent Office 3,436,963
Patented Apr. 8, 1969

3,436,963
APPARATUS FOR MAKING STANDARDIZED
TAPE SPECIMENS
Sylvester G. Domen, Sr., 3165 Orleans St.,
Mobile, Ala. 36606
Filed Jan. 31, 1967, Ser. No. 613,046
Int. Cl. G01b 19/08
U.S. Cl. 73—150                                     5 Claims

ABSTRACT OF THE DISCLOSURE

A device for preparing standardized tape specimens for testing purposes includes a roller which presses the tape against a substrate and which is provided solely with mechanical connections for effecting its movement over the tape without producing any variations of the downward forces exercised by the roller during its travel.

A precise-width cutting accessory for the tape is also employed in close proximity to the roll of tape so that the test sample can be pulled from the roll and simultaneously slit accurately to the proper width. Consequently, the tape sample can be applied immediately to the substrate without exposing the adhesive to the atmosphere for any extended period of time.

Field of the invention

The present invention relates broadly to testing tapes of the pressure sensitive type, but more particularly to the preparation of a tape specimen in a form suitable for testing according to standard procedure and on a duplicatable basis.

Pressure sensitive tapes are of many kinds, of different material and adhesive, also are available in various widths and used for a multitude of purposes. The general types of tapes in use may be roughly represented by the plastic film tape, the cellulose tape, and the paper and cloth tapes. Tapes are also employed in connection with various kinds of material, such as carton cardboard, fiberboard, glass and sometimes used to attach pieces of metal together, any or all, for the purpose of providing a strong bond which constitutes a hermetic seal between the joined parts.

Description of the prior art

While the actual testing of the tapes, according to the various standards and procedures, including those promulgated by the American Society for Testing and Material (ASTM) standard, is important, it is equally essential that the tapes be prepared for testing on a standardized, precisely duplicatable basis, regardless of the character of the test. Consequently, when the testing procedures are identical, the tape specimens will respond exactly in accordance with the relative quality of the product. Thus, a true evaluation of a tape can be obtained, regardless as to which manufacturer is conducting the test, provided standard procedures are strictly followed.

Notwithstanding the many kinds of material to which the tape is to be applied, also the different purposes and the various types of tape, it has been found by demonstration that in order to obtain consistent test results, it is desirable to form a specimen by applying the piece of tape under test to a polished stainless steel plate or substrate. The degree with which the tape adheres to the metal appears to bear a direct relation to the adhesive power as applied to other and perhaps many different materials. The overlying tape element according to the standardized requirements of ASTM should be cut to 1″ width and not less than 5″ long, also must be pressed onto the substrate by a rubber-covered 4½ lb. roller. The latter should be constructed so that the weight of the handle is not added to the weight of the roller.

Another requirement is that the specimen should be prepared within two minutes after the sample is pulled from the tape roll so as not to introduce any variable atmospheric effect on the adhesive. The tape after being cut to dimension must be applied to the substrate by running the roller first in one direction and then in the other by the operator who attempts to apply the same pressure to the successive specimens.

However, it has been found, even when great care is exercised along the lines mentioned, the test results, such as in determining the holding power of the tape to the substrate, show that there is considerable lack of conformity in the results, as pertaining to successive pieces of the same tape.

Summary of the invention

I have discovered that this lack of conformity is due, at least in part, to any one and possibly all of the following three reasons: (1) The cutting of the tape from the roll and to the proper width takes too long when done entirely by the use of scissors and furthermore the edges of the cut portion cannot normally be cut strictly parallel under these circumstances; (2) the pressure applied by the hand-operated roller is not strictly duplicatable because this pressure would depend upon the operator who, in moving the roller through the forward and return strokes, would unconsciously apply varying degrees of pressure at the handle of the roller; and (3) the speed with which the roller is moved across the tape in each direction is not duplicated as between successive tapes. The object of the invention is to eliminate the variables mentioned to the end that tape-on-substrate specimens may be prepared on a reproducible basis according to a prescribed standard as shown by the tests to which the specimens are later subjected.

This object is carried out in brief by providing mechanism by which the roller is separated from the handle and instead, is caused to move back and forth by a reciprocal rod, the weight of which is borne by a bearing. This rod is moved in a strictly horizontal direction so as not to introduce any force component in a direction other than horizontal and thus not add to the weight of the standardized roller. While reducing the width of the tape practically immediately upon removing the same from the roll, an improved slitting device is provided which assures the proper width of tape and with parallel sides.

Brief description of the drawings

FIG. 1 is a perspective view of a machine for cutting adhesive tape to the proper width, also for pressing the tape onto a plate of metal in preparing a specimen;

FIG. 2 represents an elevational view of a modified form of the machine with parts in section to show the operating motor and control. The figure is broken along the vertical line, as indicated, since otherwise the parts might have a distorted position with respect to one another;

FIG. 3 illustrates a plan view of the machine shown in FIG. 2;

FIG. 4 shows, in perspective, the front end of the machine illustrated in FIG. 2 but somewhat enlarged, to depict the graphical markings on a base plate which supports the substrate of a specimen. This figure is also broken to indicate the parts in their proper relative positions;

FIG. 5 illustrates, also enlarged and in perspective, the rear end of the machine shown in FIG. 2. This view is directed to the tape-slitting accessory; and FIG. 6 shows in perspective, a fragmentary view of one of the many testing devices to which the test specimen can be subjected.

*Description of one embodiment of the invention*

Referring to FIG. 1, reference character 1 designates an inverted U-shaped metal base constituted preferably of steel. The base is sufficiently thick so as to be rigid and thus maintain the various operating parts mounted thereon in strict alignment. At one end of the base, there is a flat metal plate 2 having a hole 3 at each end. These holes receive pins (not shown) secured to the base which serve to hold the plate 2 in place. The latter, preferably, is constituted of polished steel and is for the purpose of receiving the adhesive-treated side of a tape which is to be evaluated. A roller, generally designated at 4, and weighing approximately 4½ pounds is employed to press the tape against the plate after which the tape and plate are removed at the pins to subject the specimen to some of the comparative tests. These tests do not form a part of the invention and it is sufficient to state that they include the holding power test, the peel test, the creep test, slippage, of which one representative test will be described hereinafter. The presence of the metal substrate facilitates the testing processes and adds to the uniformity of the results as will be shown by the description of the exemplary test.

The roller 4 comprises a solid metal core 5 covered with rubber about ¼" thick, having a durometer hardness of 70 to 80. The cylindrical surface of the roller represents a true surface void of any concave or convex deviation so that the roller will apply uniform pressure across the width of its entire surface. There are roller bearings 7 carrying the ends of a yoke 8. The latter terminates in two parallel portions 9, swivelly connected at 10 to a horizontally positioned rod 11. The latter is slidably mounted in two vertical uprights 12 secured by screws 13 to the base 1. The rod 11 is swivelly connected to the end of a crank bar 14, the other end of which is pivotably mounted on a crank pin 15 secured to a round plate or disk 16. The latter is carried on a shaft 17 which passes through a fairly thick stanchion 18. The latter is secured to the base by welding or in any other manner. The shaft is extended a short distance beyond the stanchion to carry a crank 19 for turning the shaft. Thus, as the crank is turned in one direction, the roller makes one travel over a predetermined length of the substrate 2, depending on the position of the crank pin 15 with respect to the center of the disk. The crank pin is so positioned that the roller travels, at least over a distance of 5" in each direction, as the crank is turned by hand.

The roll of tape which is to be evaluated as to the quality of material and holding power of the adhesive, etc., is shown at 20. The roll may be of the regular size carrying an adhesive on one side and mounted on a stiff cardboard core of a standard inside diameter. The rolls come in various widths and it will be assumed that the roll illustrated is about 2" wide which is the popular size. The core of the roll is mounted on a steel drum 20' mounted on a shaft 21 which is rotatable on bearings provided in a pair of uprights 22. The latter conveniently constitutes legs of a U-shaped member; the connecting bar at the bottom (not shown) secured to the base 1 in any suitable manner. Thus, the roll 20 of adhesive tape can readily turn on the bearings of the drum.

It has been pointed out that in accordance with the requirements of ASTM, it is essential that the tape after being pulled from the roll 20 should be cut to 1" wide, regardless of the roll width, and provide a sample of not less than 5" long. This cutting operation was heretofore performed entirely by scissors or shears. A time limit of two minutes is set during which time the tape must be accurately cut and pressed onto the substrate 2 to form the complete specimen and immediately thereafter placed in the testing machine. The reason for this short time limit is that the air must not be allowed to come into contact with the adhesive for any extended period of time. However, it was found that the use of the scissors made the task of cutting the tape to the proper width, not only laboriously slow but also precluded obtaining a test strip which was exactly 1" wide over its entire length and had parallel edges. This requirement is necessary to ensure exact uniformity between the specimens.

In accordance with another aspect of my invention, I provide in close proximity to the roll an improved cutting device, indicated generally at 23, which performs the function of providing a strip of requisite width. The device, as shown in FIG. 1, is formed of two flat members 24 of hard refractory metal, cut to a trapezoidal shape and separated from one another at the top by a corrugated roller 25 journalled in the members 24. The latter are connected at the bottom by a spacer bar (not shown). The upper edges of the cutting device are tapered downwardly as indicated, leaving the two sharp points at 26, which are spaced a predetermined distance apart, preferably 1". The members 24 are held in a vertical position by a rigid angular piece of metal 26' which is screwed to the base. The cutting points 26 are located a short distance away from the tape roll and slightly above the line of the shaft 21. Thus, as the tape is pulled from the roll and simultaneously pressed downwardly against the sharp points, a strip of tape of exactly the requisite width is obtained as shown in FIG. 5. A length of tape of about 5" or 6" long is pulled from the roll and a pair of scissors quickly severs the sample from the roll. It will be noted that the scissors are not used to cut the side edges of the tape but simply to snip the length of tape as it is pulled a sufficient distance past the sharp edges 26.

The cut sample is then laid, adhesive face down, on the substrate 2 and the crank 19 turned in such a way that the roller 4 makes one excursion over the length of tape forward and backward. Thus, the tape is subjected to the 4½ lb. roller which can be moved at a fairly uniform rate by controlling the rotary effort at the crank. The roller should preferably be moved in the horizontal direction at a rate of about 12" per minute according to the ASTM standard. The specimen formed of the substrate and applied tape is then ready for testing, and for this purpose, the specimen is lifted from the locating pins and the tape portion of the specimen is subjected to the various tests.

It will be noted that the driving rod 11 remains horizontal throughout the movements of the roller and its weight including part of the yoke 8 is borne by the uprights 12. Consequently, there is no variation in the weight or thrust communicated to the roller during its excursions along the tape and the pressure exercised on each tape is exactly duplicated on a successive basis. There are no longer the variations present when a roller having a handle and manipulated by hand grips in different amounts is employed. Moreover, the improvement in the width cutting device 23 and its proximity to the tape roll, enables a sample strip of proper width and parallel sides to be applied to the metal substrate in the minimum time. This, again, decreases the possibility of failure to reproduce the exact conditions under which successive samples of tape can be applied to the substrate.

*Modified embodiment of the invention*

In FIGS. 2, 3 and 4, I have shown a modified form of the specimen-preparation machine in which similar reference characters refer to the same parts in FIG. 1. The base 27 is made somewhat deeper and wider than base member 1 in FIG. 1 for reasons which will be apparent as the description proceeds. The roller 4 is similar to the earlier-described device. However, the holding yoke 28 has a V-shaped end, the legs of which embrace the flattened end of a connecting rod 29. A short pin 30 serving as a pintle, passes through coincident openings in the yoke and connecting rod to allow a swivel effect at the joint. The rod is slidably supported in a bearing formed in a metal block 29' secured to the base. The height of the opening is such that the rod, throughout its reciprocatory movement is maintained in a horizontal position and in line with the center of the roller 4. The right-hand end of the rod is also flattened, as indicated at 31, and is slidably embraced by a pair of plates 32 riveted to a crank rod 33. A pin 33' passes through the plates and the flattened end 31 to constitute a swivel joint, as seen more clearly in FIG. 2. The opposite end of the crank rod is rotatably carried on a pin 34 which is fixedly mounted on a relatively large circular plate 35. This plate extends through a slot 36 in the top of the base member 27, the slot being sufficiently wide to receive the plate in addition to the crank rod 33.

The rotary plate 35 is carried on a shaft 37 journalled in an upright block of metal 38 (FIG. 2) which is secured to the base. The shaft is extended through the block and at its end carries a large worm gear 39. A small vertically positioned spindle gear 40 engages the gear 39. The spindle gear is carried on a shaft 41 which is suitably connected to a motor, preferably alternating current type, indicated at 42, and supported on a cross-bar 42' spanning the legs of the base member. Leads 43 are taken to the motor from a suitable source of current. Leads 43 are taken to a source of current and through a switch 44 of any suitable and well-known type to start and stop the motor. If desired, the switch may be time controlled in order automatically to stop the motor after a sufficient time will have elapsed to permit the roll 4 to have completed its forward and backward movements.

Thus, when the motor is energized, the worm gear 39 and the plate 35 are caused to rotate in a continuous direction to move the driving rod 29 forward and backward for a distance depending on the throw of the crank. The roller 4 is accordingly moved over the substrate 2 a distance sufficient to press at least 5″ of the sample piece of tape against the metal substrate 2 to form a specimen. The longitudinal rate of movement of the roller is controlled by the ratio of the gears 39, 40 which should be correlated with the speed of the motor to provide a movement of about 12″ per minute. In order to control the amount of movement of the roller in each direction, depending on the length of tape to be pressed, I may provide one or more intermediate openings in the plate 35 to position the pin 34, and thus adjust the throw of the crank rod. One such opening is indicated at 34'.

It will be noted in FIGS. 2 and 3 that the substrate 2 does not rest directly on the base plate as is the case in FIG. 1, but instead, is placed on a relatively large metal plate 45 which has shallow grooves along its length and width ¼″ apart. These grooves are for the purpose of quickly and accurately locating the substrate 2 on the base plate. These markings are also convenient when laying the sample of tape on the substrate exactly in the path of the roller.

As in the case of the machine shown in FIG. 1, the rod 29 always remains horizontal throughout its forward and backward movement and is in line with the center of the crank plate 35 and the roller 4. Consequently, the push-and-pull effort of the rod 29 is always in the same horizontal plane, regardless of the position of the roller and there is no vertically acting force component which might tend to add to or subtract from the downward pressing weight of the roller. The pressure on the tape sample is, therefore, uniform at all times and is reproducible during successive preparations of the specimens.

In order to maintain the roller 4 in a perfectly round condition over the period when not in use, it may be desirable to swing the roller upwardly about the pin 30 and have it rest gently on a rounded edge of the block 29'. This position is shown in phantom in FIG. 2.

In FIG. 5, I have illustrated a slitting device in modified form for obtaining sample tapes of exactly the requisite width. The improved device is seen more clearly in FIG. 5, and the same elements therein which appear in FIG. 1 have similar reference characters. Whereas in FIG. 1 the cutting device is disclosed as being rigidly supported from the base by the angular bar 26', I prefer to be able to adjust the cutting points 26 to an optimum height depending on the point of delivery from the roll 20. The improved cutter is mounted on a pair of upright bars 48 joined together by a cross-bar of metal (not shown) which fits snugly but slidably in a vertical recess formed in an upright block 49. The latter is provided with flanges 50 for receiving screws that thread into the base 27. There is a threaded opening in the side of the block for receiving wing screw 51 which presses against the cross-bar. Thus by loosening the screw, the upright bars 48 can be moved with respect to the block and the cutting points 26 adjusted to the proper height. These points can be held rigidly in position by tightening the wing screw 51.

It will be noted in FIGS. 2 and 5, that the roll of tape 20 is carried on a modified form of support. The shaft 21 is mounted in grooves 52 cut diagonally along the inside surface of a spaced pair of blocks 52' which are welded or otherwise secured to the base 27.

*Exemplary test of a specimen*

There are many different types of tests to which a combined tape and substrate can be subjected and in all of which the preparation of the specimen must be standardized and carefully made. In the case of a "holding power" test which is illustrated in FIG. 6, and perhaps, is one of the more important for a given tape, a 5 or 6″ length of the tape is cut exactly 1″ wide by the cutting points 26. In this test it is necessary that only a portion 1″ long be caused to adhere to the substrate. The remainder of the strip is prevented from adhering by means of onionskin paper having a waxy surface placed between the adhesive side of the tape and the substrate except for the 1″ square area. The latter should occur at one end of the strip leaving the remainder of the strip relatively free from the substrate. The roller is caused to make the two passes (forward and backward) over the deposited tape in order to assure pressure of a standard duplicatable amount. The substrate 2 is then secured to the top frame 53 (FIG. 6) of a cabinet in such a way that the free end 54, that is, the portion of the tape which is disengaged from the substrate, is permitted to hang downwardly as shown in the figure. The lower end of the tape may be reinforced by a cross-strip 55 and a hole 56 pierced through the tape and the cross-strip. A weight 57 of standard poundage, together with a hook 58, is attached at the hole. There may be many competing tapes tested simultaneously within the cabinet from each of which a similar weight is hung. Marking strips 59 may be attached to the individual sample tapes while being tested to give a visual indication of the gradual separation of the tape from the limited area on the substrate at the point marked 60 under the influence of the weight 57. The front of cabinet is preferably covered by a plastic curtain (not shown) so that the interior can be maintained uniformly at a predetermined standardized temperature. Obviously, the slower the tapes separate from their substrates, as shown by the successive positions of the markers 59, will become at least one comparable measure of the "holding power" of the various tapes under test. Other tests such as the creep test, adhesion test, slippage, and still others, may employ different apparatus from that shown. Some of the tests require adhesion of the tape over the entire five inches of the specimen rather than a limited area of the adhering portion. But in all cases, the success of the tests from the comparable values obtained, depends almost entirely on the uniformity with which the sample piece has been cut to size, particularly in its width and the manner in which it has been pressed against the substrate assuming that the latter in all cases is exactly duplicatable.

While certain specific embodiments have been described, it is obvious that numerous changes may be made without departing from the general principles and scope of the invention.

I claim:
1. Apparatus for preparing uniform adhesive tape specimens for test purposes, said apparatus comprising: a base member adapted to receive a metal substrate on which is placed a test sample of the tape with the adhesive side down, and means for applying pressure to the tape, said means including a roller having a centrally located bearing extending therethrough, a rod element swivelly mounted with respect to said bearing and located in a horizontal position, and means for applying successively a steady pushing and pulling effort to the rod to cause the roller to move over the tape, first in one direction and then in the other direction, while maintaining the rod in the horizontal position whereby the pressure exerted by the roller on the tape remains relatively constant throughout the reciprocating movement of the rod.

2. Apparatus for preparing uniform adhesive tape specimens for test purposes according to claim 1 and in which the means for applying successively the pushing and pulling effect on the rod includes a crank device and a crank arm swivelly connected to the end of the rod remote from the roller, the center of said device being in line with the axis of the reciprocatory rod and the center of the roller whereby the horizontal position of the rod is maintained during each of the successive pushing and pulling operations.

3. Apparatus for preparing uniform adhesive tape specimens for test purposes according to claim 2 in which said rod is slidably received in a bearing which is mounted on the base and carries a substantial part of the weight of the rod in order that the pressure on the tape shall be limited to the weight of the roller.

4. Apparatus for preparing uniform adhesive tape specimens for test purposes according to claim 2, said crank being carried on a journalled shaft, a circular plate having a toothed periphery mounted on said shaft, a worm gear engaging the teeth on said plate, and a motor for operating the worm gear.

5. Apparatus for preparing uniform adhesive tape specimens for test purposes according to claim 4 and a switch for de-energizing the motor after the predetermined pushing and pulling movement of said rod which represents one forward and one backward movement of the roller of equal amount over the tape.

References Cited

UNITED STATES PATENTS

| | | | |
|---|---|---|---|
| 2,604,783 | 7/1952 | Herrlinger | 73—150 |
| 2,815,664 | 12/1957 | Dawes et al. | 73—423 |
| 2,837,155 | 6/1958 | Cundiff et al. | 73—421 XR |
| 3,276,303 | 10/1966 | Tompos | 73—421 XR |

FOREIGN PATENTS 888,935   9/1953   Germany.

LOUIS R. PRINCE, *Primary Examiner.*

JEFFREY NOLTON, *Assistant Examiner.*

U.S. Cl. X.R.

156—580